United States Patent [19]
Creek

[11] Patent Number: 6,050,692
[45] Date of Patent: *Apr. 18, 2000

[54] METHOD OF CONSTRUCTING A THIN FILM MIRROR

[75] Inventor: Roy Edward Creek, Newick, United Kingdom

[73] Assignee: SEOS Displays Limited, West Sussex, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/945,001

[22] PCT Filed: Feb. 19, 1997

[86] PCT No.: PCT/GB97/00456

§ 371 Date: Oct. 9, 1997

§ 102(e) Date: Oct. 9, 1997

[87] PCT Pub. No.: WO97/31277

PCT Pub. Date: Aug. 28, 1997

[30] Foreign Application Priority Data

Feb. 21, 1996 [GB] United Kingdom .................. 9603646

[51] Int. Cl.$^7$ ............... G02B 5/08; G02B 7/182
[52] U.S. Cl. ............ 359/847; 359/871; 359/900
[58] Field of Search ................ 359/846, 847, 359/848, 872, 900, 868, 866, 871

[56] References Cited

U.S. PATENT DOCUMENTS

| 2,952,189 | 9/1960 | Pajes ................................. 359/847 |
| 3,031,928 | 5/1962 | Kopito ............................... 359/847 |
| 3,337,660 | 8/1967 | Bagby ................................ 359/847 |
| 3,877,139 | 4/1975 | Martinez . |
| 3,973,834 | 8/1976 | Penn et al. . |
| 4,046,462 | 9/1977 | Fletcher et al. ................... 359/847 |
| 4,097,126 | 6/1978 | Mahleen et al. ................... 359/847 |
| 4,128,310 | 12/1978 | Miller ................................ 359/847 |
| 5,247,395 | 9/1993 | Martinez . |

FOREIGN PATENT DOCUMENTS

| 2491816 | 10/1980 | France . |
| 0208705 | 12/1983 | Japan ................................ 359/847 |
| 0159613 | 7/1986 | Japan ................................ 359/847 |

*Primary Examiner*—Ricky D. Shafer
*Attorney, Agent, or Firm*—Iandiorio & Teska

[57] ABSTRACT

A method of constructing a thin film mirror, which method comprises constructing the mirror from thin plastics film on a suction chamber (8) which has: (i) top and bottom edges (AA', BB') which lie on a required mirror surface; (ii) ends that each have a contact surface to the thin plastics film that lies on a required mirror surface which can be developed from a plane so that the thin plastic film is able readily to be attached; and (iii) no abrupt discontinuities in a mirror support edge part (ABC) of the suction chamber.

5 Claims, 3 Drawing Sheets

METHOD OF CONSTRUCTING A THIN FILM MIRROR

This invention relates to a method of constructing a thin film mirror.

The use of thin film mirrors as part of image projection display systems for use in large field-of-view presentation is well known. The large field-of-view presentation may be, for example, simulation, leisure, computer aided design or visualization presentation. Typically, thin film mirrors are used in simulation apparatus such for example as flight simulation apparatus where the thin film mirrors are used in off-axis optical systems to produce a wide angle collimated or near collimated display to be viewed by a pilot or trainee.

The thin film mirrors are usually constructed by a method which involves attaching a thin plastics film to form the mirror on a chamber which has one open side. A suction pump is used to partially evacuate the chamber so that the thin plastics film is sucked into the required shape for forming the thin film mirror. The shape of the thin film mirror is determined by characteristics of thin plastics film used, and by the shape of the edges of the chamber which provide the support for the mirror surface, The geometric accuracy of the mirror is often one of the major factors in the quality and usefulness of the image projection display systems. The accuracy of the edges of the chamber and the way in which the plastics film is applied to the edges is crucial to the geometry of the thin film mirror. The thin film mirror is normally required to be spherical, toroidal, or spheroidal. The edges of the chamber are shaped such that they lie on the mirror surface. Thus the top and bottom edges of the mirror are usually parts of minor circles, and the ends of the mirror are usually lines of longitude. Minor circles are those described by the circumference of a circular plane section that is produced when a sphere is cut in a plane that does not pass through the sphere centre. An example of a minor circle is a line of latitude, upon which the top and bottom edges of a mirror cell typically lie.

The mirror film is initially a sheet which is part of a frustum of a cone laid flat. With known designs of suction chambers, the thin plastics film can be lightly tensioned to form a cord between the top and bottom chamber edges, to which the thin plastics film can then readily be attached. Attachment to the side edges of the chamber is more difficult because the thin plastics film must be stretched uniformally in order to transition from a chord to an arc which corresponds to the curvature of the end of the suction chamber. This stretching must be performed in a radial direction from the centre of curvature, in order to minimise distortion in the finished thin film mirror. The problem of securing the film at the ends to accommodate both directions of curvature and to reduce distortion to an insignificant extent is well known.

There are two principal methods currently used to construct thin film mirrors. The first method is to use temporary chamber extensions which are removed after the thin plastics film has been stretched to the required shape. The second method is to use a mechanical stretching device to force the mirror film edge to take up the required shape. Both of these known methods result in an abrupt discontinuity of the film edge at each corner of the final thin film mirror assembly. The film is initially in sheet form and it is converted into its final form by plastic and elastic deformation. In the corners of the suction chamber, the film is constrained along two edges by the use of an edge fixing arrangement and hence is considerably more resistant to stretching than a section of film located at an edge well away from the corner, where it is restrained only along one edge. In the case of the mechanical stretching device, friction between the mirror film and the stretching device can result in non-uniform stretching of the film which results in local geometrical errors in the produced thin film mirror.

It is an aim of the present invention to obviate or reduce the above mentioned problems.

Accordingly, the present invention provides a method of constructing a thin film mirror with a non-circular edge, where all of the non-circular edge lies on an intersection of a required mirror surface with a single surface developed from a plane, which method comprises:

(a) providing a suction chamber which has:
 (i) top and bottom edges which lie on a surface of one of a cone and a cylinder and which also lie on the required mirror surface;
 (ii) permanent ends that each has a contact surface for a thin plastics film that lies on the required mirror surface and which are able to be developed from a plane so that the thin plastics film is able readily to be attached without the need for predistortion or stretching of the thin plastics film; and
 (iii) no abrupt discontinuities in a mirror film edge part of the suction chamber; and (b) providing the thin plastics film on the suction chamber;

(c) attaching the thin plastics film to the said top and bottom edges and the said ends of the suction chamber; and (d) applying suction to the suction chamber such that the thin plastics film lies on the required mirror surface without the said pre-distortion or stretching of the thin plastics film.

It will be appreciated that in the method of the invention, the suction chamber is manufactured such that there is no abrupt directional discontinuity in the edge clamping of the thin plastics film to form the thin film mirror, and the contact surface of each end of the suction chamber assembly forms a plane, or a surface developed from a plane, on to which the thin plastics film is able to be mounted without the need for temporary extension pieces or mechanical stretching devices to give the exact boundary conditions for the mirror surface required. Examples of surfaces that can be developed from a plane are cones and cylinders, where a planar film surface could be formed to that shape without any deformation of the film.

In the method of the invention, the thin plastics film may be attached to the said ends of the suction chamber such as to define two lines of attachment which are in the form of smooth curves. Alternatively, the two lines of attachment may be semi-circles or semi-ellipses.

Generally, the said lines of attachment may be such as to lie on an intersection of a sphere (toroid or spheroid) and a surface which is a plane or can be developed from a plane, for example a cylinder, a cone or a frustum.

If the method of the invention is to be used for producing a spherical thin film mirror, then the method may be one in which the top and bottom edges of the suction chamber are in the form of parts of minor circles, and in which the ends of the suction chamber are each a half minor circle with the chords through the ends of the top and bottom sections of the minor circles as diameters.

An embodiment of the invention will now be described solely by way of example and with reference to the accompanying drawings in which.

Figure 1:
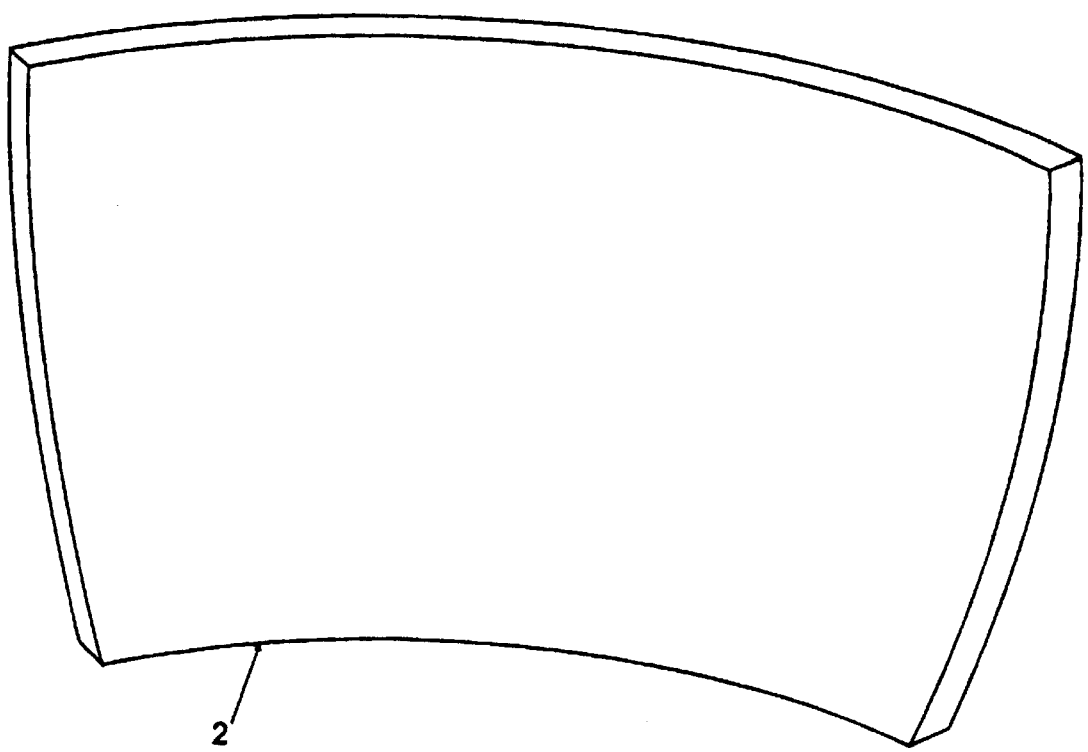
FIG. 1 shows a known chamber for use in producing a known thin film mirror.
Figure 2:
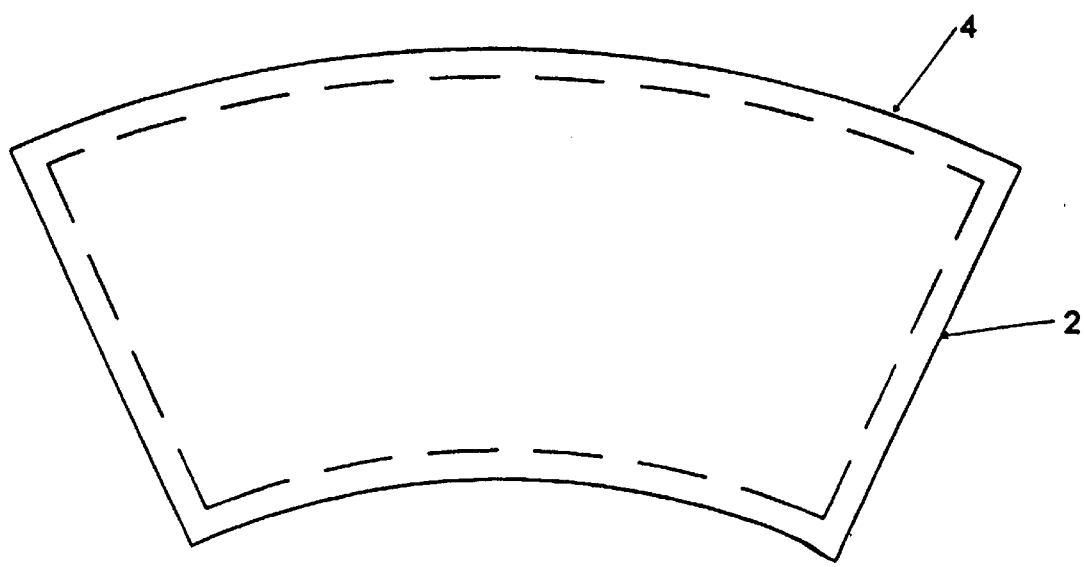
FIG. 2 shows the chamber of FIG. 1 when provided with a thin plastics film for use in forming the thin film mirror.

Referring to FIGS. 1 and 2, a known thin film mirror is able to be produced using a chamber 2 as shown in FIG. 1. The chamber 2 is open on one side and, as shown in FIG. 2, a thin plastics film 4 is attached to the chamber 2. A suction pump (not shown) is employed to partially evacuate the chamber 2 so that the thin plastics film 4 is sucked into the required shape. The shape of the produced thin film mirror is determined by characteristics of the thin plastics film 4, and by the shape of the edges of the chamber 2 which provides support for the surface of the thin film mirror to be formed. The thin film mirror is initially a sheet which is part of the frustrum of a cone laid flat. FIG. 2 shows such a sheet, where the dotted lines show the required lines of contact with the chamber edges, and the parts outside the dotted lines allow for fixing along the supporting edges of the chamber 2.

Figure 3:
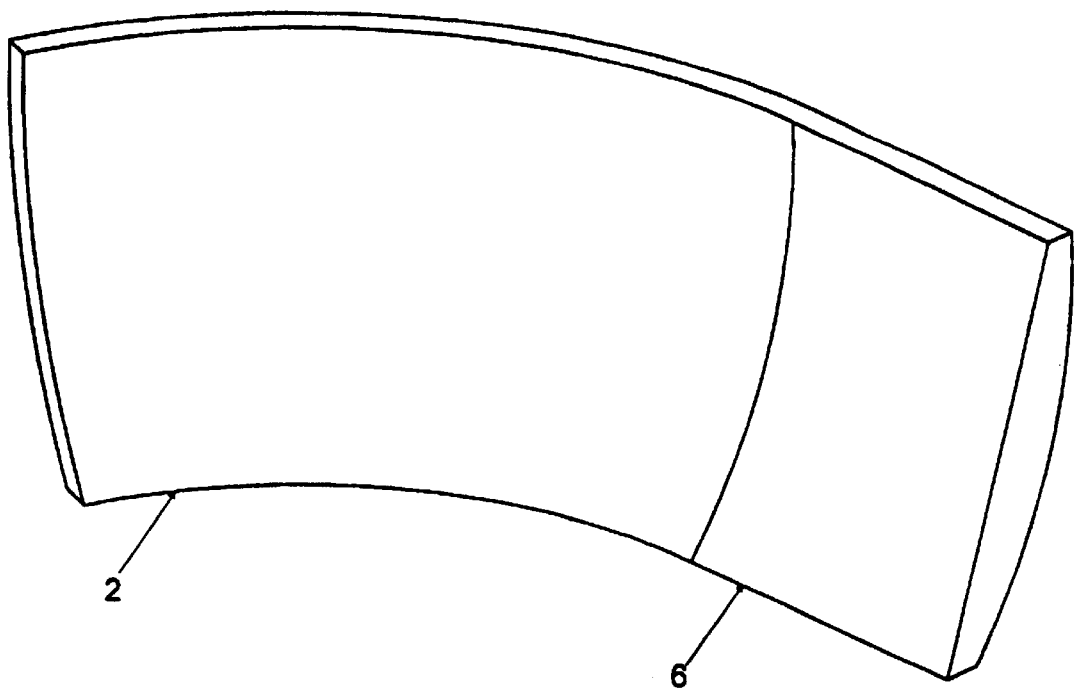
FIG. 3 shows an extension piece for the suction chamber.

As mentioned above, one known method of producing a thin film mirror is to use temporary chamber extensions. FIG. 3 shows part of the chamber 2 with a temporary chamber extension 6. A temporary chamber extension 6 can be fitted to both ends of the chamber 2 for use in producing the thin film mirror. The temporary chamber extension 6 provides tangential extensions to the top and bottom edges of the mirror and terminates in a chord, thus forming a plane to which the extended mirror sheet can be attached. The mirror sheet is then sucked into the chamber spherical side edges where it can be clamped, the temporary chamber extensions 6 removed, and the thin film attached to the ends of the chamber 2. The amount of residual distortion at the side edges of the thin film mirror so produced is very dependent on the length of the temporary chamber extensions 6, with longer temporary chamber extensions 6 enabling a greater reduction in distortion to be achieved.

As an alternative to employing temporary chamber extensions, it is known to produce thin film mirrors using a mechanical stretching device to force the mirror film edge to take up the required shape. One such mechanical stretching device is described in U.S. Pat. No. 4,592,717. In this USA patent, the thin plastics film is attached to the top and bottom edges of a suction chamber, and a flexible strip is attached to the side edge of the film along a chord between the ends of the top and bottom edges. The film is then mechanically stretched in a constrained radial direction until it matches the arc formed on the side edge of the suction chamber. The film is then attached to the suction chamber.

As mentioned above, the construction of thin film mirrors using temporary chamber extensions or mechanical stretching devices results in an abrupt discontinuity of the film edge at each corner of the final mirror assembly. The film is initially in sheet form and it is converted into its final form by plastic and elastic deformation. In the corners of the suction chamber, the film is constrained along two edges by the edge fixing arrangement and hence is considerably more resistant to stretching than a section of film located at an edge well away from the corner, where it is restrained only along one edge. In the case of the mechanical stretching device, friction between the mirror film and the stretching device can result in non-uniform stretching of the film which results in local geometrical errors. These problems are able to be overcome or substantially reduced by constructing a thin film mirror by a method using a suction chamber as shown in FIG. 4.

Figure 4:
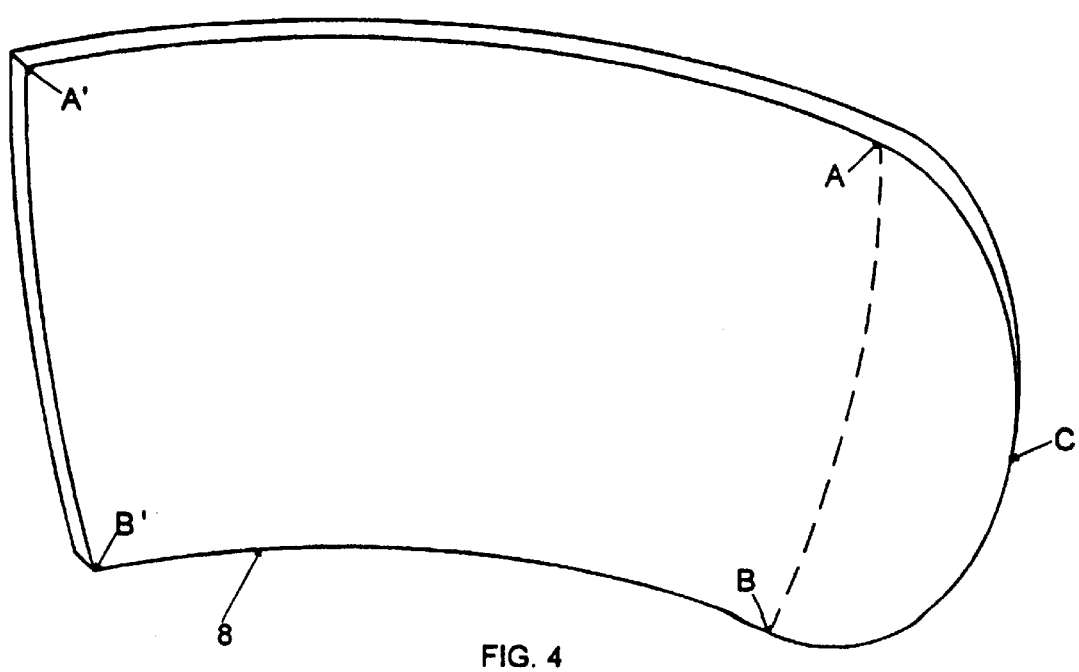
FIG. 4 shows one end of a suction chamber as used in the method of constructing a thin film mirror in accordance with the present invention.

Referring now to FIG. 4, there is shown one end of a suction chamber 8 for the case of a sphere and a plane. Points A'ACBB' lie on the surface of a sphere. Points A'A form the top of the mirror and they lie on a minor circle, as do points B'B which form the bottom of the mirror. Points AB are points on a line of longitude. Points ABC lie in a plane and on a minor circle which has the chord AB as a diameter. Thus a thin plastics film to form a thin film mirror may be mounted to the curve ACB without the need for external extensions or mechanical stretching devices.

Figure 5:
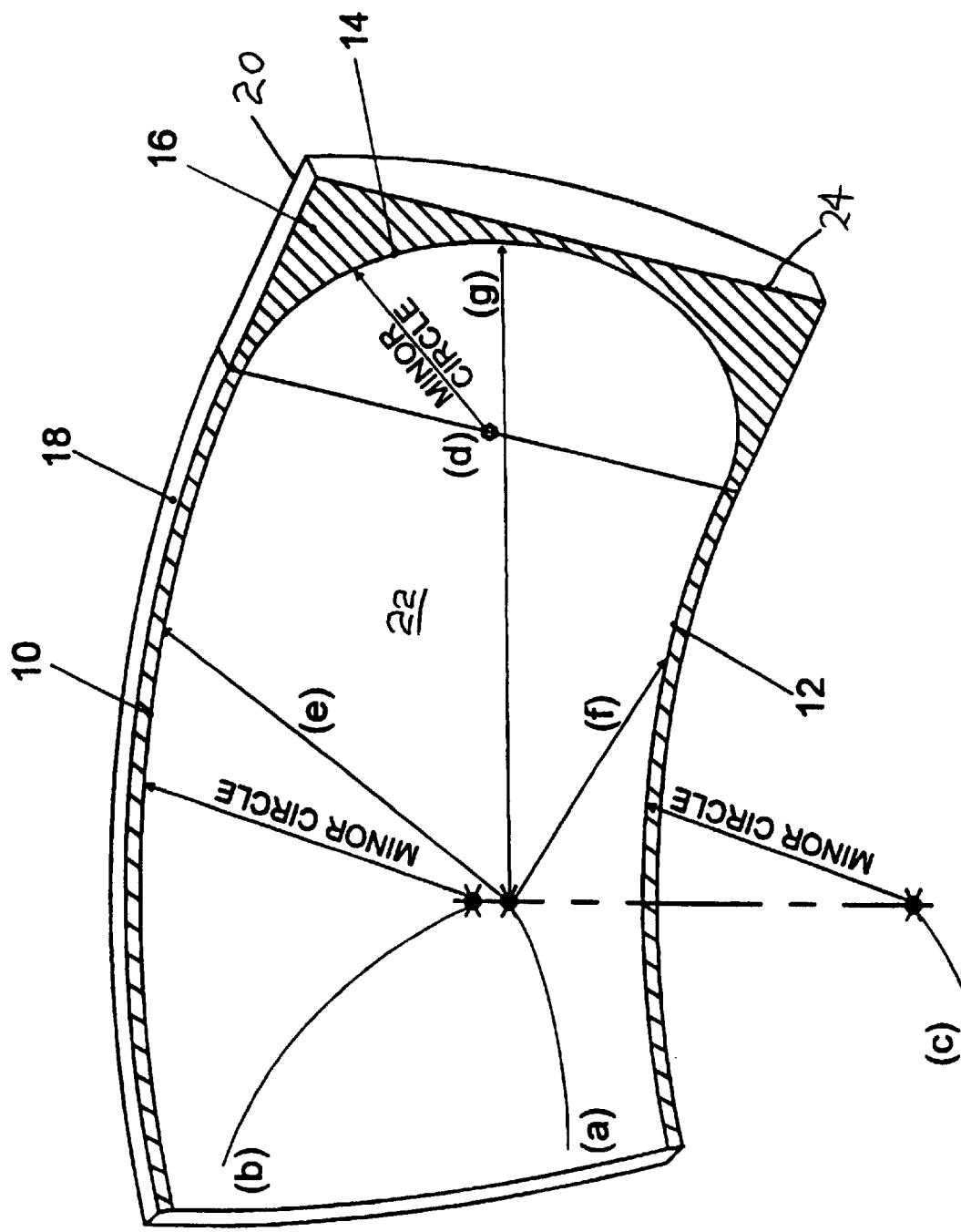
FIG. 5 shows in detail a practical application of the invention for the case of a sphere.

FIG. 5 is like FIG. 4 but shows in more detail a practical application for the case of a sphere. In FIG. 5 point (a) is the centre of curvature of the required mirror. Point (b) is the centre of the minor circle forming a top film retention edge 10. Point (c) is the centre of the minor circle forming a bottom film retention edge 12. Point (d) is the centre of the minor circle forming an end film retention edge 14.

Points (b) and (c) lie on a vertical axis passing through point (a). Point (d) is at the mid point of a chord drawn between the top and bottom film retention edges.

The shaded area in FIG. 5 shows the film attachment surface 16 which can be developed from a plane.

The distances (e), (f) and (g) are the distances from the required mirror centre of curvature to any point on the top, bottom and end film retention edges 10, 12, 14 respectively. The distances (e), (f) and (g) equal the radius of the required mirror.

Also shown in FIG. 5 is a suction chamber 18 and a permanent end 20. A thin plastics film 22 lies over the suction chamber 18 and the permanent end 20. The permanent end 20 has a contact surface 24 for the thin plastics film 20.

It is to be appreciated that the embodiment of the invention described above with reference to FIG. 4 has been given by way of example only and that modifications may be effected. Thus, for example, the thin film mirror may be constructed using any of the known thin plastics films used for constructing known thin film mirrors. Also, the levels of suction employed may be the same as or similar to those levels currently employed for producing known thin film mirrors. The various materials used to form the thin film mirror and the various suction techniques are not central to the present invention and thus they have not been described in detail although it is mentioned that a preferred material for the thin plastics film is an optical grade polyester, and a preferred suction value is approximately 0.25 p.s.i at operating draw depth.

What is claimed is:

1. A method of constructing a thin film mirror with a non-circular edge, where all of the non-circular edge lies on an intersection of a required mirror surface with a single surface developed from a plane, which method comprises:

(a) providing a suction chamber which has:
  (i) top and bottom edges which lie on a surface of one of a cone and a cylinder and which also lie on the required mirror surface;
  (ii) permanent ends that each has a contact surface for a thin plastics film that lies on the required mirror surface and which are able to be developed from a plane so that the thin plastics film is able readily to be attached without the need for pre-distortion or stretching of the thin plastics film; and
  (iii) no abrupt discontinuities in a mirror film edge part of the suction chamber; and (b) providing the thin plastics film on the suction chamber;

(c) attaching the thin plastics film to the said top and bottom edges and the said ends of the suction chamber; and (d) applying suction to the suction chamber such that the thin plastics film lies on the required mirror surface without the said pre-distortion or stretching of the thin plastics film.

2. A method according to claim 1 in which the thin plastics film is attached to the said ends of the suction chamber such as to define two lines of attachment which are in the form of smooth curves.

3. A method according to claim 1 in which the thin plastics film is attached to the said ends of the suction chamber such as to define two lines of attachment which are semi-circles.

4. A method according to claim 1 in which the thin plastics film is attached to the said ends of the suction chamber such as to define two lines of attachment which are semi-ellipses.

5. A method according to claim 1 and which is for producing a spherical thin film mirror, and in which the thin plastics film is attached to the said top and bottom edges of the suction chamber such as to define two lines of attachment which are in the form of parts of minor circles, and in which the thin plastics film is attached to the said ends of the suction chamber such as to define two lines of attachment which are half minor circles with the chords through the ends of the top and bottom sections of the minor circles as diameters.

\* \* \* \* \*